Feb. 24, 1925.
J. KUNST ET AL
CABLE BOX
Filed Sept. 22, 1921
1,527,804
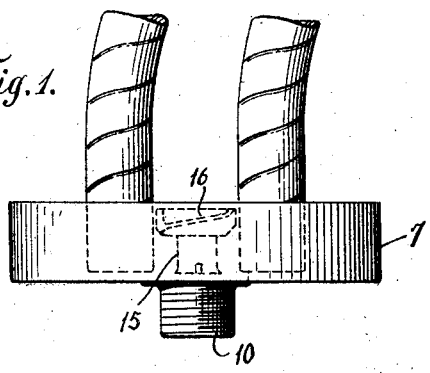
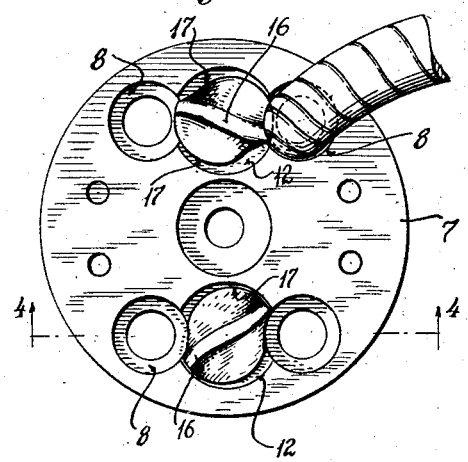
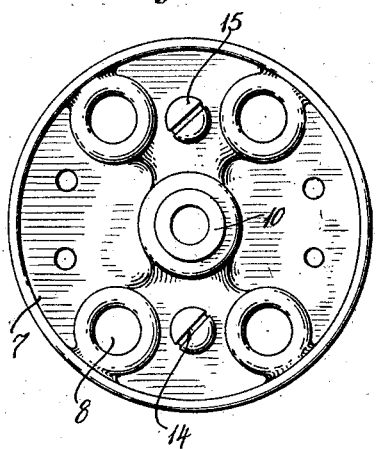
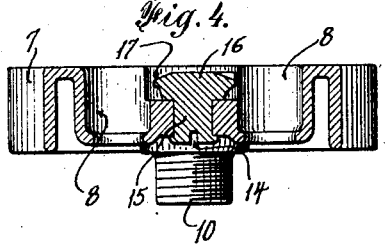
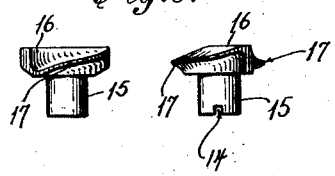
Inventor
John Kunst
Herman L. Strongson
By James C. Ledbetter
Attorney Patented Feb. 24, 1925.

1,527,804

UNITED STATES PATENT OFFICE.

JOHN KUNST, OF NEW YORK, AND HERMAN L. STRONGSON, OF BROOKLYN, NEW YORK, ASSIGNORS, BY DIRECT AND MESNE ASSIGNMENTS, TO THE THOMAS & BETTS CO., OF ELIZABETH, NEW JERSEY, A CORPORATION OF NEW JERSEY.

CABLE BOX.

Application filed September 22, 1921. Serial No. 502,518.

*To all whom it may concern:*

Be it known that we, JOHN KUNST and HERMAN L. STRONGSON, citizens of the United States, residing at 43 Murray St., New York (J. K.), and Brooklyn, N. Y. (H. L. S.), in the county of New York and county of Kings and State of New York, have invented certain new and useful Improvements in Cable Boxes, of which the following is a specification.

This invention relates to cable and conduit anchorages used in electric light and power installations; and more particularly to improvements in cable and conduit boxes.

The installation of electric light and power transmission lines oftentimes, in order to fulfill the requirements of the law, necessarily have to be enclosed in flexible conduit coverings; and the cable and conduits must have their ends securely anchored to a metal fitting, which fitting positively holds the cable conduit in position, and permits the electrical connections to have a suitable outlet to fixtures. There are various types of cable boxes in use, but which are more or less expensive to manufacture and are not always positive in their locking function.

It is fitting, therefore, that the primary object of this invention is to produce improvements in cable lock boxes to overcome the disadvantages of cable boxes now in use; and likewise it is an object to improve and simplify the design and construction of cable boxes to the end that they may be more economically produced.

Furthermore it is an object of this invention to produce a cable box having a relatively small number of parts; and furthermore it is an object to so construct the cable box that no machining operations are necessary prior to assembling the parts.

The accompanying drawings illustrate the preferred design and construction, but the right of protection is claimed to all such changes in design, construction and operation as may come within the scope of this invention.

Figure 1 shows a side view, or an edge view, of the cable box with cable conduits inserted therein, and the locking device is shown in dotted lines in normal unlocked position.

Figure 2 shows a front face view of the cable box to illustrate a design of the locking parts; and Figure 3 illustrates a reverse view, or a back side view, from that of Figure 2.

Figure 4 shows a cross-sectional view of the cable box taken on the line 4—4 of Figure 2.

Figure 5 shows a cluster view, or two detailed views, of the locking device removed from the base or cable box casting.

A cable and conduit anchorage and lock box constructed in accordance with the principles of this invention embodies a single piece unitary casting constructed as a base. The base is suitably cored out with the necessary sockets to receive the ends of the cable conduits, and likewise has a rotary locking device which is journaled in the base in close relation to one or more sockets so that the device binds and engages the conduit cable to hold it in locked position.

In presenting a more comprehensive and detailed disclosure of the invention, further reference is made to the drawings wherein the base or casting is indicated by the numeral 7. Any suitable number of sockets 8 are formed in the base to receive an end of the cable conduit, which end or ends are locked by a specially designed clamping and binding cam as herein described. It is usually practical to form, by coring operations, the base or box 7 with sockets 8 arranged in pairs, two pairs usually being provided in the base and diametrically opposite each other so that two pairs of cable conduits, namely, four in all, may be firmly anchored to one box. The cable sockets 8 are so formed as not to pass entirely through the wall of the box, but are reduced in size so as to form an abutment shoulder against which the cable conduit rests when locked in position. A hole, having a diameter less than that of the socket 8, is formed through the cable box wall connecting with the socket 8, which, in fact, produces the shoulder hereinbefore mentioned. This smaller hole permits an outlet for wiring and fixture connections.

The cable box likewise has a screw-threaded shank or stud 10 to which lighting fixtures may be attached. The box or base part 7 is preferably formed with a large core hole made in the center thereof for the purpose of lightening and reducing the amount of metal embodied in the part. The foregoing description, in fact, covers a practical design of a cable box meeting the requirements of present day practice; and the invention more in particular relates to an improvement used in connection with the aforesaid box for the purpose of locking the cable ends firmly to the box.

A socket 12 is made between each pair of cable sockets 8, and this socket 12 is employed to rotatably retain a locking cam. Socket 12 has a journal bearing hole made through the wall of the box; and the rotatable locking cam is of such design as to be confined in the socket, and be rotated by a stem journaled in the bearing said cam functioning in such a manner as to move outwardly into the socket space 8 whereby it binds and clamps against the cable.

Figure 5 shows two detailed views of the locking cam; and the views are shown in side elevation, one being taken on an angle of about 90 degrees to the other so as to show the general contour of the locking edge or face of cam. A stem 15 has a screw-driver or other suitable tool socket 14 made therein; and a mechanic installing the cable box inserts a screw-driver into the socket for the purpose of rotating the cam. The stem 15 is made integral with a cam-head 16, and the cam-head is finished off on the perimeter thereof with engaging edges 17 eccentric to the axis of the stem 15. Each cam 16, in fact, is made double which is to say it has oppositely arranged binding eccentric edges 17 whereby either one or two cables are locked by a single cam. The capacity of the cam to lock one or two cables resides in the fact that the eccentricity of the binding edges 17 causes the cam 16 to move outwardly into the socket space 8 of both sockets of the pair when the operator rotates the stem 15 with the result that the two eccentric binding edges jam with great force against the cable thereby positively anchoring it to the box.

An additional feature of the locking cam 16 resides in the specially designed eccentric engaging edges or ribs 17. The drawings show the engaging edges or ribs 17 as formed on an angle with the axis of the stem 15 which is to say the engaging edges are in fact made in the form of a helix to simulate a screw-thread. The helical engaging edges 17, begins with a short radius co-incident with the upper plane of the cam-head 16, and travels downwardly with an increasing radius until the end of the screw edge 17 is co-incident with the lower plane of the cam-head 16. The increasing diameter of the screw and engaging edge of the cam imparts eccentricity thereto so that it forms, for all purpose and intent, an ordinary cam which engages, with ever increasing force, against the wall of the cable conduit. The function of the screw-shaped or helical eccentric edge is to draw the cable inwardly as the cam rotates; and this function is in addition to the transverse clamp function of the cam. It is to be noted, therefore, that the cam locks the cable in the box by virtue of two functions, namely, its ability to jam against the cable transversely to the axis of the cable conduit, and to draw the cable into the box along a line parallel to the axis of said cable. The ability of this cable box to positively lock and hold the cable conduits in position is pronounced because of the double locking capacity of the cams whereby a single cam not only holds two cables in position, but locks the cables transversely and longitudinally.

The construction and assembly of the cable box is very simple inasmuch as no machine or finishing work is necessary prior to assembling the two locking cams in a single base. It is to be noted that the cable box comprises only three parts, and the box 7, inasmuch as it is cast with the necessary sockets, and the journal bearing made therein, is immediately ready to receive the stems of the locking cams. When the stem is placed in position, the outer end thereof, which contains the screw-driver socket, is spun down or riveted over to hold the cam in position yet permit it to be easily rotated. This manner of assembling the base and cams is very simple inasmuch as no material expense is involved, nor is skilled labor required.

In installing a cable box and making the cable conduit connections therewith, the mechanic inserts the end of a cable into the socket 8, or inserts two cables into the sockets, and then exerts turning pressure on a screw driver or other suitable tool inserted in the tool socket 14. The cam 16 slowly turns into clamping engagement with both cables by causing the two oppositely disposed engaging edges 17 to press into the wall of the cable such as is shown in dotted lines in Figure 2 where the edge 17 of the cam has embedded itself and forced a securely anchored connection with the cable conduit.

In connection with installing the cable box and anchoring the cables to the box, it is impossible for the mechanic to turn the cam in the wrong direction. The cam of course is freely rotatable in the socket 12 as long as it does not meet the obstruction of the cable wall. If the operator should attempt to rotate the cam in the wrong direction, the head or ribbed center of the cam abuts against the cable wall causing a permanent stoppage of the rotary motion of the cam which of course does not effect the desired clamped connection with the cable. The operator is thereby informed of the fact that anchorage is not secured, and he immediately reverses the direction of his tool to turn the cam 16 in the other direction which causes a gradually increased engaging action between the eccentric edge 17 and the cable wall.

A cable box and conduit anchorage of this type is positive in function, simple to manufacture, and fills a want felt for a device of this character.

Having described the invention, what is desired to be secured by Letters Patent is:

1. A cable box comprising a base having suitable openings for the reception of the cable ends and for the reception of suitable locking devices, a double cam rotatably confined in one of the openings to lock one or two cables to the box, and means provided to prevent the cam from being rotated in the wrong direction.

2. A cable box conduit anchoring device comprising a base to receive a conduit and cable end, a cam confined in the base, and said cam having an engaging face formed on an angle to the axis of cam rotation whereby the conduit and cable end is gripped by the angular cam face and drawn inwardly against the base and jammed tight against the base wall to anchor the cable to the base, and a stop made on the cam to strike the conduit wall whereby the cam may not inadvertently be turned in the wrong direction.

3. A cable box conduit anchoring device comprising a base to receive a conduit and cable end, a cam, means rotatably mounting the cam in the base, and said cam having an engaging face formed at an angle to the axis of the cam whereby the cable end is gripped by the cam face and drawn inwardly and jammed tight against the base, and a stop made on the cam to prevent the cam from turning in the wrong direction.

4. A cable box comprising a base to receive conduit ends, a rotary cam disc, means rotatably mounting the cam disc in the base including a stem carried by the disc, means on the stem for receiving a tool for forcibly rotating the disc against the cable end, and a stop to prevent the disc from being rotated in the wrong direction.

5. A cable box having reception means for cable and conduit ends, a stem journaled in the cable box, a screw-driver tool socket made on one end of the stem, a cam made on the other end for engaging the cable end under frictional pressure to anchor the cable to the box, and an abutment surface formed on the cam to strike the cable if the cam is turned the wrong direction.

6. A cable box having reception means for cable and conduit ends, a stem journaled in the cable box, a screw-driver tool socket made on one end of the stem, and a double cam made on the other end for engaging the cable end under frictional pressure to anchor the cable to the box.

7. A cable box comprising a base to receive and hold cable and conduits placed in sockets made in the base, a socket formed in the base, a cam confined in the socket, said cam having an engaging face disposed below the surface of the base, means for rotating the cam whereby the said cam grips the cable at a point below the surface of the base which jams the cable against the wall of the socket to firmly anchor the cable within the socket, and an abutting surface made on the cam to act as a stop to prevent the cam from being turned in the wrong direction.

8. A cable box comprising a base having sockets to receive conduits, a cam having oppositely arranged gripping faces made eccentric to the axis of the cam, a stem having a tool holding means for rotating the cam which causes the eccentric gripping faces to clamp and anchor a pair of cables to the box, and the said cam being disposed in the box below the surface thereof to exert clamping pressure against the conduit.

9. A cable box comprising a base having suitable means for receiving the ends of the cable conduits to be locked in position, and a locking cam rotatably confined in the box, and the said locking cam having an engaging edge formed thereon which is made eccentric to the cam axis and which edge is made helical to the cam axis.

10. A cable box comprising a casting provided with sockets to receive cable ends, a shoulder formed at the bottom of the sockets against which the cable rests, a cam, means for rotatably mounting the cam in the casting between the sockets, a pair of engaging ribs made on the cam at an angle to the axis thereof to simultaneously execute a combined longitudinal and lateral thrust on a cable in each socket, and stops formed on the cam engageable with the said cables to prevent the cam from rotating in the wrong direction.

11. A cable box having sockets spaced apart therein to receive cable ends, a cam rotatably carried in the box, and a double eccentric engaging means carried by the cam with each means adapted to press into a cable in the aforesaid sockets.

12. A cable box provided with a cable socket, a cam rotatably mounted in the box adjacent the socket, and an engaging rib carried by the cam disposed below the box surface and running helically in relation to the cam axis.

13. A cable box having double sockets to retain one or two cable ends, a cam journaled in the box diametrically aligned with the double sockets, an eccentric rib occupying substantially one half of the cam and adapted to press into a cable in one socket, and another eccentric rib occupying the other half of the cam adapted to press into a cable in the other socket.

In witness whereof, we have hereunto affixed our hands and seals this 21st day of September, A. D. 1921, in the city of New York, borough of Manhattan, county of New York and State of New York.

JOHN KUNST. [L. S.]
HERMAN L. STRONGSON. [L. S.]